J. M. BRYSON.
HOSE CLAMP.
APPLICATION FILED NOV. 18, 1916.
1,356,904.
Patented Oct. 26, 1920.
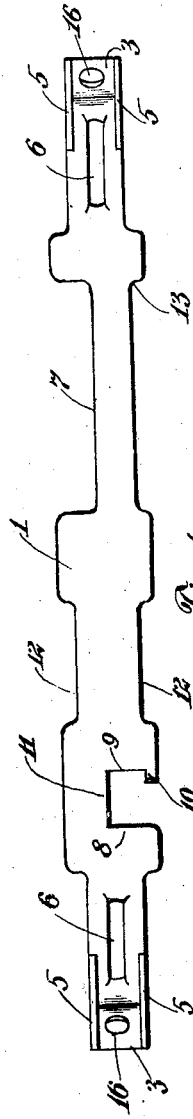
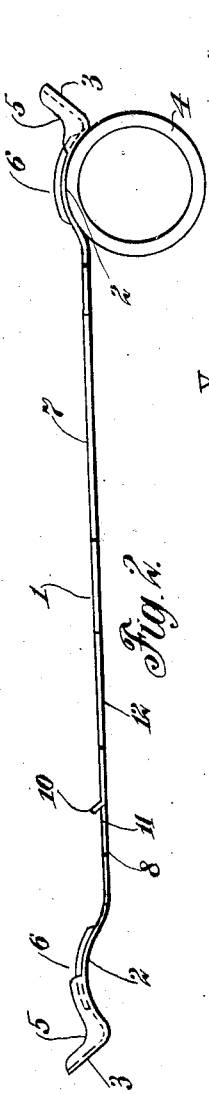
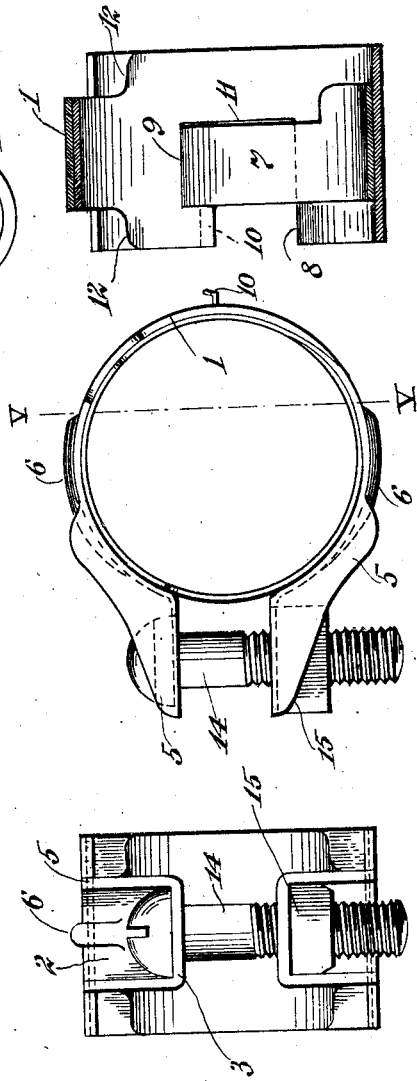
Inventor
John M. Bryson.

UNITED STATES PATENT OFFICE.

JOHN M. BRYSON, OF DETROIT, MICHIGAN.

HOSE-CLAMP.

1,356,904.  Specification of Letters Patent.  Patented Oct. 26, 1920.

Application filed November 18, 1916. Serial No. 132,197.

*To all whom it may concern:*

Be it known that I, JOHN M. BRYSON, a citizen of the United States of America, residing at Detroit, in the county of Wayne and State of Michigan, have invented certain new and useful Improvements in Hose-Clamps, of which the following is a specification, reference being had therein to the accompanying drawings.

This invention relates to a hose clamp, and the primary object of my invention is to provide a metallic flexible or pliable strap of novel design, that may be wrapped around a hose or other conduit, and temporarily held thereon until the ends of strap may be connected or otherwise fixed.

Another object of my invention is to provide a hose clamp embodying a metallic strap having side edges thereof cut away or notched so that as the strap is wrapped about a hose or other conduit, the notched edges of the strap may be interlocked and end portions of the strap overlap central portions thereof, thus providing practically a two-ply twice wrapped or entwined clamp possessing considerable strength and binding power when holding a hose on a connection.

A further object of my invention is to provide a clamp of the above type which can be easily cut and stamped from sheet metal and in so doing formed to facilitate the operation of securing the end of a hose or similar conduit upon a connection.

The above and other results are attained by a mechanical construction that will be hereinafter specifically described and then claimed, and reference will now be had to the drawings, wherein—

Figure 1 is a plan of the hose clamp prior to being wrapped on a hose;

Fig. 2 is an edge view of the same in position to be wrapped about a hose;

Fig. 3 is a front elevation of the hose clamp in a wrapped or closed position;

Fig. 4 is a side elevation of the same, and

Fig. 5 is a cross sectional view taken on the line V—V of Fig. 4.

The hose clamp comprises a metallic flexible or resilient strap 1 and when the hose clamp is in an open position, the strap may be considered as being flat as shown in Figs. 1 and 2, with the ends thereof provided with curved portions 2 and angularly disposed extremities 3. The curved portions 2 are described on an arc approximately that of the periphery of the hose on which the clamp is to be mounted and one of the curved portions 2 is shown in Fig. 2 as conforming to a portion of the periphery of a hose 4. The extremities 3 are disposed at an angle to the curved portions 2 and at the juncture of the curved portions 2 with the extremities 3 there are side flanges 5 disposed in parallelism as stiffening members between the portions 2 and the extremities 3. The side flanges 5 coöperate with the extremities 3 in forming pockets for the head of a screw or bolt and a nut mounted thereon, as will hereinafter appear.

Coöperating with the side flanges 5 in adding rigidity to the curved portions 2 of the strap are raised or embossed strength reinforcing ribs 6 and these ribs are adapted to maintain the shape of the portions 2 and the extremities 3 irrespective of any bending or flexing of the body portion of the strap 1.

The strap 1, adjacent one end thereof has a neck or reduced portion 7 and adjacent the opposite end of the strap there is a side notch or recess 8 having a wall 9 thereof provided with an outstruck lug 10 adapted to coöperate with another wall 11 of the notch or recess in retaining the neck 7 of the strap therein when the strap is wrapped or wound about the hose 4. The neck 7 is set in from one edge of the strap 1 so that it will longitudinally aline with that space between the lug 10 and the wall 11 of the notch or recess 8, and as the notch or recess is open upon the same side having the neck portion 7, the neck portion can be easily placed in the notch or recess when mounting the strap upon the hose.

To reduce the weight of the strap and increase the flexibility of the same, the longitudinal edges of the strap are cut away or recessed as at 12, providing a portion that is practically the same width as the ends of the strap.

Taking the strap as shown in Fig. 1, it can be easily wrapped about the hose 4 and it is preferable to place the body portion of the strap under the hose and bring the ends of the strap up over the hose so that the strap will assume cylindrical form. In bending the ends of the strap upwardly over the hose, the neck end of the strap is carried through the notch or recess 8, so that the neck 7 will eventually extend through the notch or recess 8, engage the wall 9 and be held between the wall 11 and the lug 10, with the lug engaging that portion or shoulder of the strap designated 13, at one end of the neck 7. In this manner the strap will be temporarily held wound on the hose, and to further wind the strap and permanently clamp the same upon the hose, the extremities 3 of the strap are connected by a screw 14 provided with a nut 15. The extremities 3 are apertured as at 16 to receive the screw and the head of the screw is seated on one extremity and the nut 15 on the other extremity. The nut 15 will be held against rotation by the flanges 5 and by using a screw driver or suitable instrument the screw 14 may be rotated to draw the extremities 3 toward each other and thus contract the strap upon the hose. The strap now has the form of a two-ply band, the ends of the strap in close proximity to each other on the body of the strap and by reference to Fig. 4, it will be observed that the inner wall of the strap or band is devoid of any protuberances that would cut or injure the hose when clamped upon the connection.

A hose clamp in accordance with my invention may be advantageously used in connection with water, steam and air conduits, and since the clamp is easily installed it permits of connections being easily and quickly made.

One embodiment of my invention has been illustrated but it is to be understood that the structural elements are susceptible to such alterations as are within the scope of the appended claim.

What I claim is:—

A hose clamp comprising a strap adapted to be wrapped about the hose and have its ends connected together, said strap in its flat form having a neck portion adjacent one end thereof and a wide portion adjacent its other end having a notch extending inward from one edge of the strap and adapted to receive the neck portion of said strap, the wide portion of said strap having a lug projecting longitudinally of the strap inwardly of said notch adjacent the outer end of the notch, said neck portion being offset laterally from the longitudinal center line of the strap to bring it into longitudinal alinement with the inner end portion of the notch between said lug and inner end of the notch so as to restrict the entrance to the notch and to engage the edge of the neck portion and retain the same within the notch, said neck portion having a widened portion adjacent the end thereof opposite that which is connected to the wide end of the strap, to prevent the neck portion from pulling endwise out of the notch when engaged therein, and means on the strap ends for connecting the same.

In testimony whereof I affix my signature in the presence of two witnesses.

JOHN M. BRYSON.

Witnesses:
KARL H. BUTLER,
ANNA M. DORR.